United States Patent [19]

Kita

[11] Patent Number: 5,514,941
[45] Date of Patent: May 7, 1996

[54] NUMERICAL CONTROL DEVICE FOR PREDICTING A MACHINING TERMINATION TIME

[75] Inventor: Yuki Kita, Oshino, Japan

[73] Assignee: Fanuc Ltd., Yamanashi, Japan

[21] Appl. No.: 244,999

[22] PCT Filed: Oct. 22, 1993

[86] PCT No.: PCT/JP93/01531

§ 371 Date: Jun. 21, 1994

§ 102(e) Date: Jun. 21, 1994

[87] PCT Pub. No.: WO94/10614

PCT Pub. Date: May 11, 1994

[30] Foreign Application Priority Data

Oct. 26, 1992 [JP] Japan ................................. 4-309774

[51] Int. Cl.$^6$ ................................................ G05B 19/18
[52] U.S. Cl. ........................ 318/569; 318/601; 364/474.16
[58] Field of Search ............................ 318/560, 561–562,
318/563, 565, 567, 568.1, 569, 590, 600–603,
671; 364/148, 160, 474.01–474.11, 474.12,
474.14, 474.15, 474.16, 474.22, 474.19

[56] References Cited

U.S. PATENT DOCUMENTS 4,980,532  12/1990  Morishita ........................... 364/474.01

FOREIGN PATENT DOCUMENTS

| 60-80546 | 5/1985 | Japan . |
|---|---|---|
| 62-121602 | 8/1987 | Japan . |
| 1-138107 | 9/1989 | Japan . |
| 1-304504 | 12/1989 | Japan . |

*Primary Examiner*—David S. Martin
*Attorney, Agent, or Firm*—Staas & Halsey

[57] ABSTRACT

A reference machining speed and an offset value for each machining cycle are specified with reference to a machining condition table of a nonvolatile memory in accordance with a set workpiece material, workpiece thickness, wire electrode diameter, and machining frequency. An overall machining path length for each machining cycle is obtained in accordance with a machining movement command given by a machining program, the wire electrode diameter, and the offset value. A machining time required for executing an entire machining operation is obtained by integrating all the required machining times for the individual machining cycles that is obtained by dividing the overall machining path lengths for the individual machining cycles by the reference machining speed for the individual machining cycles, and an operator is informed of an expected machining termination time as the sum of a current time read from a clock device and the required machining time that is displayed on a CRT screen of a CRT/MDI.

7 Claims, 6 Drawing Sheets

NUMERICAL CONTROL DEVICE FOR PREDICTING A MACHINING TERMINATION TIME

TECHNICAL FIELD

The present invention relates to a numerical control device for reporting an expected termination time of program machining using an NC machine tool.

BACKGROUND ART

Totally unmanned operation is practical in program machining using an NC machine tool, and an operator need not monitor the machining work except for prearranging operations such as mounting of workpieces, starting of machining programs, etc. Thus, while the NC machine tool is executing programmed machining, the operator can perform prearranging operations for the next machining cycle or other odd jobs. If the operator is previously informed of the time of termination of the machining, however, he can more smoothly carry out operations such as removal of machined workpieces, transfer of workpieces to the next machining stage, etc.

Conventionally, in order to know an expected machining termination time, the operator used to compute a required machining time manually in accordance with the machining shape, set machining speed, etc. given by a machining program, thereby estimating the time when the machining would terminate. However, when one and the same portion of a workpiece has to be finished, for example, by repeating several machining cycles ranging from rough machining to finish machining, machining conditions naturally vary with the individual cycles, so that the average speed of tool movement for each cycle, tool offset value for each cycle, and, therefore, tool movement path length for each cycle (overall length of machining locus for each machining stage) vary. Accordingly, the machining time varies with the individual machining stages. Thus, in order to estimate the necessary machining time for any one portion of workpiece in advance, various conditions such as the machining frequency, machining conditions for each machining stage, tool offset value, etc., besides the machining shape given by the machining program, should be taken into consideration, and an accurate estimation usually requires complicated calculations.

Some NC machine tools are designed for being capable of adaptively controlling the machine speed in order to obtain uniform work surfaces. In the cases of the NC machine tools with such arrangement, however, the set machining speed does not always agree with the actual machining speed. Even though complicated manual calculations are made in consideration of the offset value and the like, the required time calculated not based on the actual machining speed but based on the set machining speed may lack in accuracy in some cases.

SUMMARY OF THE INVENTION

The object of the present invention is to provide a numerical control device, in which the aforesaid drawbacks of the prior art are eliminated; the operator can easily be informed of an expected machining termination time without performing time-consuming calculating operations; and expected machining termination time can be detected more accurately than by the conventional method despite a difference even when actual speed deviates from set machining speed.

In order to achieve the above object, according to an aspect of the present invention, a numerical control device for controlling a machine tool comprises: a required machining time computing means for computing a time required for the execution of an entire machining operation based on a machining program in accordance with a work load and a set machining speed given by the machining program; a clock means to operate synchronously with the current time; an expected machinining termination time computing means for computing an expected machining termination time in accordance with the required time computed by the required machining time computing means and the current time given by the clock means; and a display means for displaying the expected machining termination time.

According to another aspect of the present invention, moreover, a numerical control device for controlling a machine tool comprises: a machining speed detecting means for detecting the actual machining speed during the execution of a machining program; a work load computing means for computing a work load corresponding to an unexecuted portion of the machining program; a required machining time computing means for computing a time required for the execution of an entire machining operation based on the unexecuted machining program in accordance with the actual machining speed detected by the machining speed detecting means and the work load computed by the work load computing means; a clock means to operate synchronously with the current time; an expected machining termination time computing means for computing an expected machining termination time in accordance with the required time computed by the required machining time computing means and the current time given by the clock means; and a display means for displaying the expected machining termination time computed by the expected machining termination time modifying means.

Preferably, the expected machining termination time is obtained, with every predetermined period for the execution of the machining program, by means of the machining speed detecting means, work load computing means, required machining time computing means, clock means, and expected machining termination time computing means, and is updated and displayed on the display means.

Preferably, moreover, the expected machining termination time is obtained, with every predetermined number of blocks for the execution of the machining program, by means of the machining speed detecting means, work load computing means, required machining time computing means, clock means, and expected machining termination time computing means, and is updated and displayed on the display means.

According to still another aspect of the present invention, a numerical control device for controlling a machine tool for repeatedly executing a number of machining stages from rough machining to finish machining by using one machining program comprises: a stage average speed estimating means for estimating an average machining speed from the start to end of each machining stage in accordance with machining conditions previously set for each machining stage; a stage path length computing means for computing a machining path length for each machining stage in accordance with the machining program and the machining conditions; a stage required time estimating means for estimating a required machining time for each machining stage in accordance with the computed values given by the average speed estimating means and path length computing means; an executed machining path length calculating means for calculating the length of a machining path from a starting position of the currently executed machining stage to the current position; an elapsed machining time determining means for starting the operation for determining an elapsed machining time after being reset synchronously with the start of each machining stage; an actual average machining speed computing means for computing an actual average machining speed for the machining path from the machining starting position of the currently executed machining stage to the current position in accordance with the elapsed machining time given by the time determining means and the executed machining path length computed by the executed machining path length calculating means; a required machining time for remaining machining path estimating means for estimating a required machining time for machining an unexecuted portion of the currently executed machining stage in accordance with a value obtained by subtracting the executed machining path length, calculated by the executed machining path length calculating means, from the machining path length for the currently executed machining stage, computed by the stage path length computing means, and the average machining speed computed by the actual average machining speed computing means; a total required machining time for remaining machining stage estimating means for adding up required times estimated for the individual machining stages from the machining stage next to the currently executed machining stage to the final machining stage by means of the stage required machining time estimating means; an expected machining termination time computing means for obtaining the point of time of the lapse of a period of time, after the current time, equal to the sum of the machining time required for remaining machining path estimated by means of the required machining time fop remaining machining path estimating means and the required machining time estimated by means of the total machining time required for remaining machining state estimating means; and an expected machining termination time display means for displaying the expected machining termination time obtained by means of the expected machining termination time computing means.

Preferably, the computation or estimation by means of the machining path length computing means, actual average machining speed computing means, required machining time for remaining machining path estimating means, total required machining time for remaining machining state estimating means, and expected machining termination time computing means is executed with every predetermined time or with every termination of a predetermined number of machining blocks constituting the machining program, and the machining termination time is updated and displayed each corresponding time by the machining termination time display means.

Preferably, moreover, the numerical control device further comprises an average machining speed modifying means that fetches the actual average machining speed for a finished machining stage from the actual average machining speed computing means, compares the value with the estimated average machining speed for the corresponding machining stage estimated by means of the state average speed estimating means, and modifies the output of the required machining time for remaining machining state estimating means based on the result of the comparison.

According to the numerical control device of the present invention, as described above, the numerical control device itself automatically computes the expected machining termination time beforehand in accordance with the work load and the set machining speed given by the machining program, and displays it on the display means, so that the computation of the expected machining termination time requires no time-consuming manual calculation, and an operator can easily be informed of the expected machining termination time. Since the computation of the work load for machining is executed by internal processing of the numerical control device, the expected machining termination time can be obtained based on an actual work load which varies depending on the offset value of a tool and the like, so that a more accurate expected machining termination time can be detected. Furthermore, in executing the machining program, the actual machining speed is detected, and correction is made in accordance with the actual machining speed to update and display the expected machining termination time, so that even when there is a difference between the set machining speed and the actual machining speed, the expected machining termination time can be detected with a relatively high accuracy.

DESCRIPTION OF THE PREFERRED EMBODIMENTS

One embodiment of the present invention will now be described with reference to the accompanying drawings. In this embodiment, the present invention is applied to a numerical control device of a wire electrical discharge machine. In the description to follow, the wire electrical discharge machine is supposed to be one adapted for multiple machining. This numerical control device registers a machining locus as a subprogram, and invokes the subprogram to execute machining while changing the wire diameter correction value and machining conditions according to a main program. More specifically, machining is carried out for a given machining locus under predetermined machining conditions and with a predetermined offset value in a first machining stage (rough machining), and, in a second machining stage (intermediate machining), the machining is carried out for the same spot under lower machining conditions and with a smaller offset value than in the first stage. Thereafter, machining is continued until an N-th or final (finish) machining stage.

Figure 1:
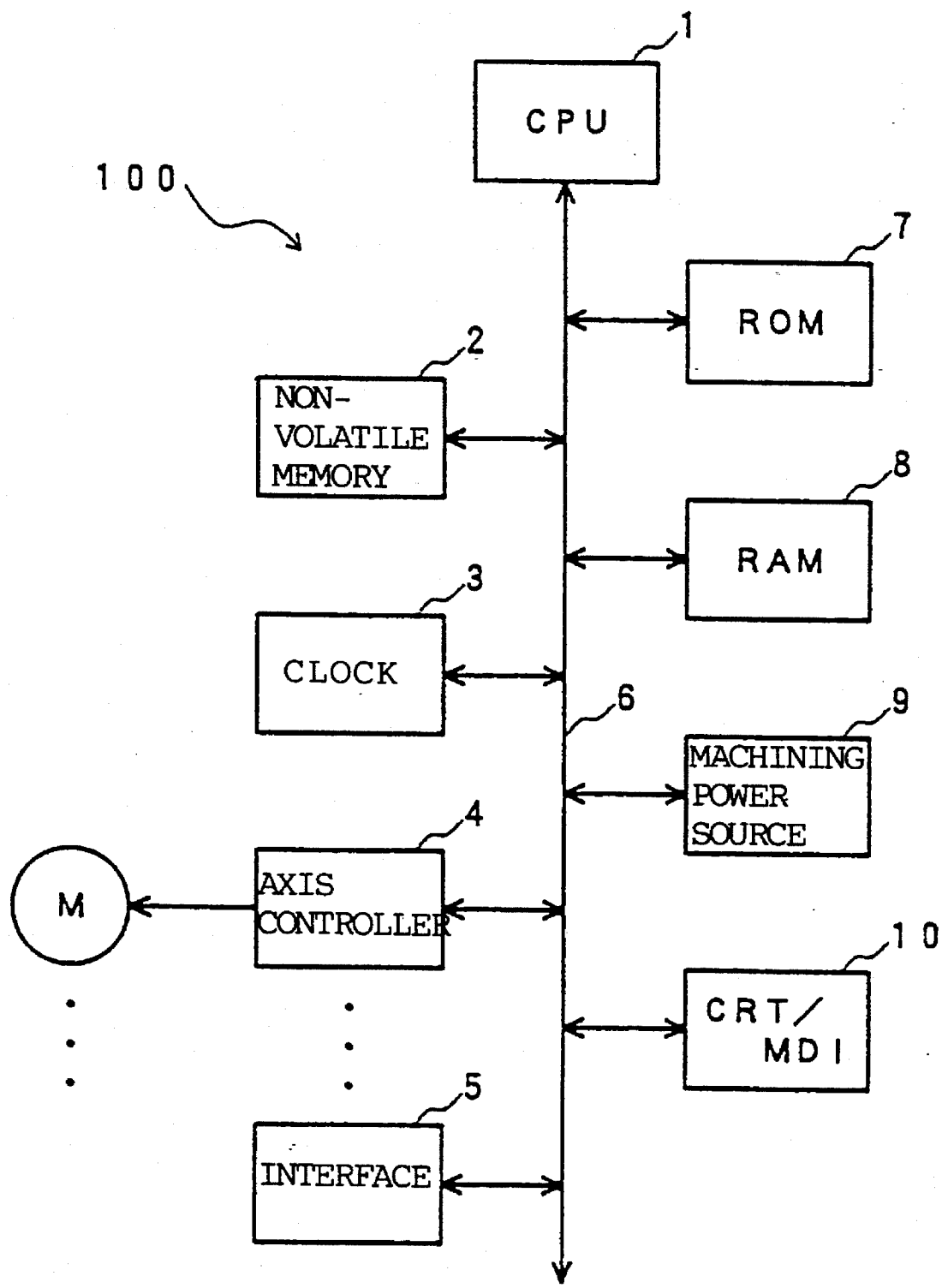
FIG. 1 is a block diagram showing the principal part of a numerical control device according to one embodiment to which the present invention is applied.
Figure 2:
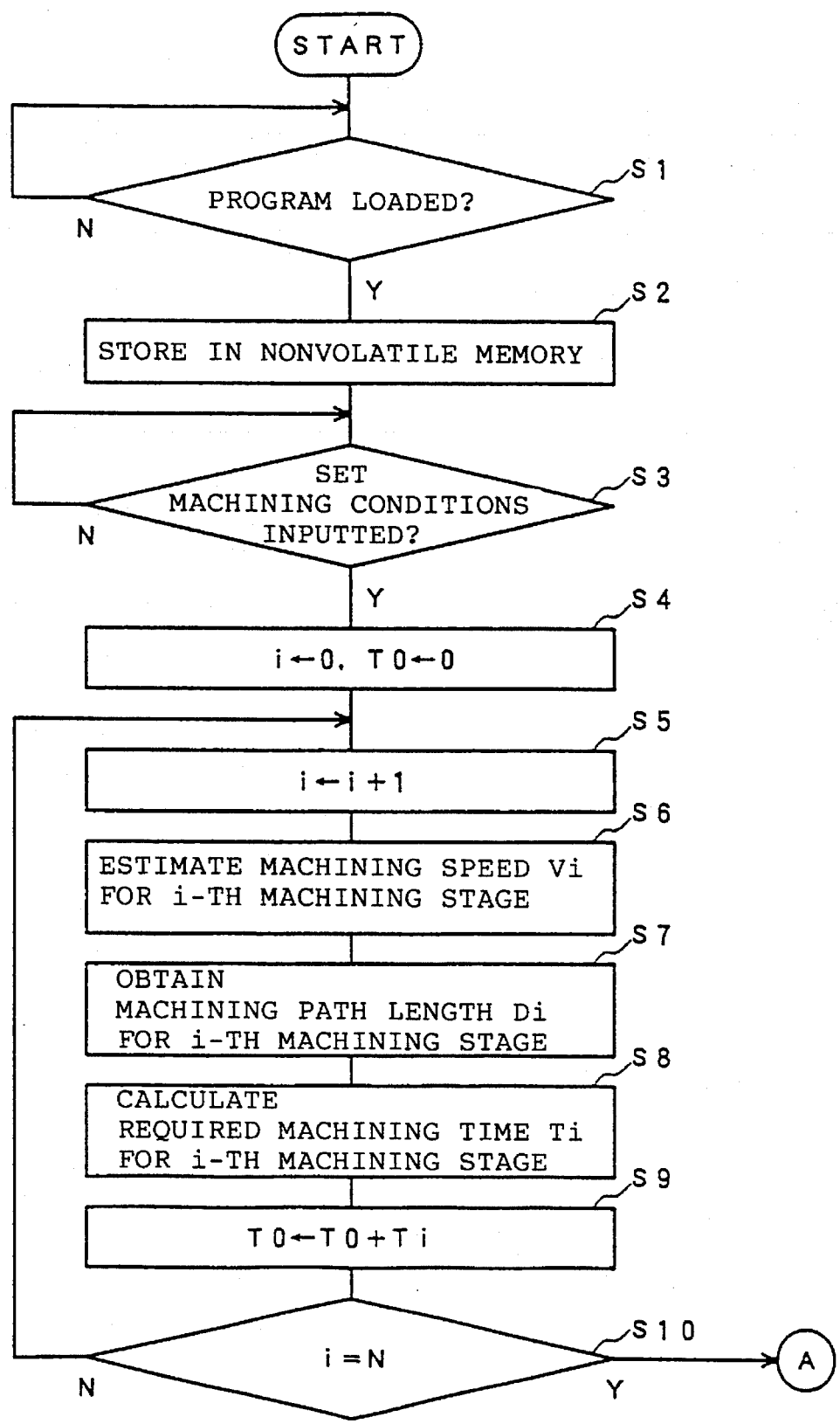
FIG. 2 is a flow chart showing an outline of a processings to be executed in a machining execution mod by the numerical control device of the embodiment.
Figure 3:
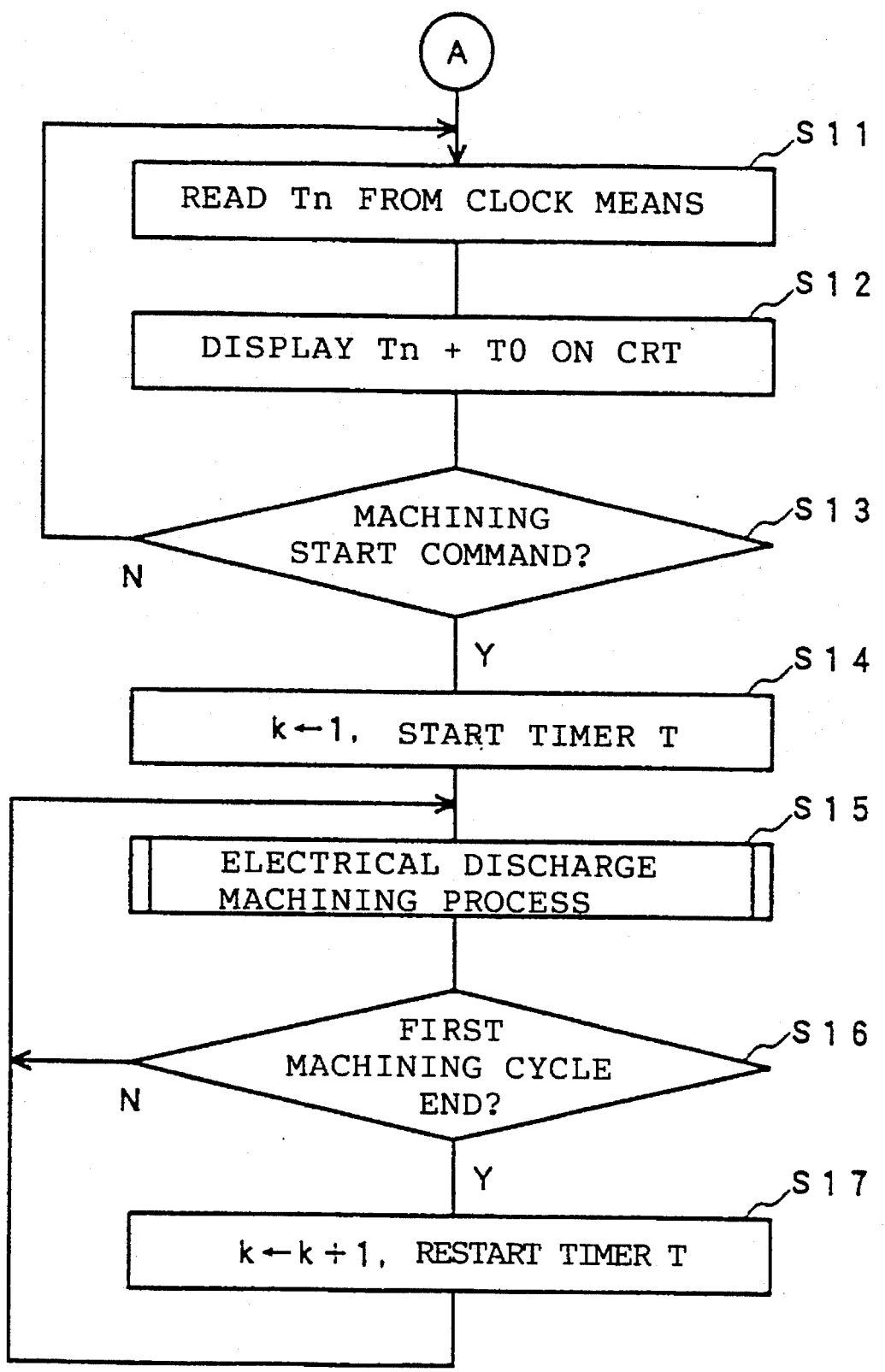
FIG. 3 is a continuation of the flow chart showing the outline of the processing in the machining execution mode.

FIG. 1 is a block diagram briefly showing the principal part of a numerical control device 100 according to the embodiment. The numerical control device 100 comprises a microprocessor (hereinafter referred to as CPU) 1 for operating and controlling various parts of the wire electrical discharge machine. The CPU 1 is connected with a ROM 7, RAM 8, manual data input device (hereinafter referred to as CRT/MDI) 10, input/output interface 5, nonvolatile memory 2, clock device 3, axis controllers 4 for individual axes (four axes X, Y, U and V according to the embodiment), and electrical discharge machining power source 9 of the 10 wire electrical discharge machine through a bus 6 so that entry and delivery of data and drive and control of the machine can be effected. The ROM 7 stores control programs of the CPU 1 and the like. The RAM 8 is for temporary storage of the results of computation by the CPU 1 and the like. The CRT/MDI 10 is provided with a CRT display unit for use a display. The input/output interface 5 is used to connect a tape reader, external storage device, etc. The nonvolatile memory 2 is for storing the programs and the like loaded from the tape reader, external storage device, etc. The clock device 3 operates synchronously with the current time. The axis controllers 4 control a necessary number of servomotors M which drive the individual axes of the wire electrical discharge machine. Since the hardware configuration of the numerical control device 100 itself is the same as the conventional one except that the clock device 3 is included, a detailed description of it will be omitted.

For the feed of each axis during the execution of machining, adaptive control or servo feed is applied so that the average of gap voltages between a wire electrode and a workpiece is maintained equal to a set value, in order to keep an electrical discharge gap or offset between the wire electrode and the workpiece at a fixed value in accordance with various machining conditions. The machining speed is not always fixed even though conditions including the material and thickness of the workpiece, wire electrode diameter, machining frequency, etc. are unchanged.

The nonvolatile memory 2 is previously loaded with a machining condition table which stores machining conditions including the peak voltage and on-off time of the electrical discharge machining power source 9, servo voltage, etc., offset of the wire electrode, empirically known maximum and minimum values of the machining speed, and the like, for each combination of various conditions including the workpiece material, workpiece thickness, wire electrode type, wire electrode diameter, i-th machining stage (i: integer ranging from 1 to N as a final number), etc.

When an operator enters the workpiece material, workpiece thickness, wire electrode type, and electrode diameter, etc. in the numerical control device 100 by means of the CRT/MDI 10, the offset of the wire electrode and the machining conditions are automatically selected from the machining condition table of the nonvolatile memory 2 through the processing operation of the CPU 1 based on the control programs of the ROM 7. These selected machining conditions are automatically set, and wire electrical discharge machining is carried out.

FIGS. 2 to 5 are flow charts showing an outline of processings, which the CPU 1 executes in accordance with the control programs of the ROM 7 in a machining execution mode. Referring now to these flow charts, the processing operation according to the present embodiment will be described.

When set for the machining execution mode, the CPU 1 first waits for the entry of a machining program from the tape reader or any other external device through the input/output interface 5. When the entry of the machining program is detected (Step S1), this machining program is loaded, as an execution object machining program, into a machining program storage region of the nonvolatile memory 2 (Step S2). Further, the CPU 1 enters standby state until the operator inputs set conditions including the workpiece material, workpiece thickness, wire electrode diameter to be used, machining frequency N, etc. through the operation panel of the CRT/MDI 10. When the set conditions are inputted, they are stored in the nonvolatile memory 2 (Step S3).

Subsequently, the CPU 1 initializes an index i for the storage of the machining frequency N and the value of a total required time storage register T0 to "0" respectively (Step S4), and then increase the value of the index i by 1 (Step S5). Based on the set conditions stored in the nonvolatile memory 2 and the machining frequency i defined by the value of the index i for the storage of the machining frequency, the CPU 1 reads a minimum machining speed Vi(min) and maximum machining speed Vi(max) for the i-th machining stage corresponding to the set conditions from the machining condition table of the nonvolatile memory 2, estimates a machining speed Vi corresponding to the i-th machining stage by dividing the sum of the minimum and maximum machining speeds Vi(min) and Vi(max) by 2, and stores a register R(Vi) with this estimated machining speed Vi (Step S8).

Then, the CPU 1 from the beginning and successively retrieves individual blocks which constitute the machining program stored in the nonvolatile memory 2, thereby retrieving all machining movement commands for the wire electrical discharge machining. Thus, the overall length of a tool movement locus for the i-th machining stage is calculated according to the offset value and wire electrode diameter selected from the corresponding machining condition table, and the resulting calculated value is stored as a machining path length Di for the i-th machining stage in a stage10 machining path length storage register R(Di) (Step S7).

Subsequently, the time required for the i-th machining stage, that is, estimated required time Ti, is obtained by dividing the machining path length Di for the i-th stage by the estimated machining speed Vi obtained in the processing of Step S6, and this value is stored in an estimated required time storage register R(Ti) (Step S8). Further, the value of the estimated required machining time Ti is integratively stored in the total required time storage register R(T0) (Step S9).

Then, the CPU 1 determines whether or not the machining frequency N set in the selected machining condition table is reached by the value of the index i for the storage of the machining frequency. More specifically, it is determined whether or not the computation and storage of the estimated machining speed Vi, machining path length Di, and required machining time Ti for the i-th machining stage, and the integration and storage of the estimated required machining time Ti are completed for all the machining stages from the first machining stage to the final machining stage (Step S10). If the set machining frequency N is not reached by the value of the index i, the program proceeds again to the processing of Step S5, whereupon the looped processings of Steps S5 to S10 are repeatedly executed. Thus, the computation and storage of the estimated machining speed Vi, machining path length Di, and required machining time Ti for the i-th machining stage are executed, and moreover, the total estimated required time T0 for the machining stages ranging from the first machining stage to the i-th machining stage is computed.

If the decision in Step S10 is YES (Y), that is, if it is concluded that the aforesaid looped processings are completed, the CPU 1 reads the current time Tn from the clock device 3 (Step S11), adds the estimated required machining time T0 for the completion of all the machining stages, which has been stored in the total required time storage register R(T0), to the value Tn to obtain an estimated machining termination time (Tn+T0), and displays this value on a CRT screen of the CRT/MDI 10 to inform the operator of it (Step S12). Then, the CPU 1 determines whether or not a machining start command is inputted through the console panel of the CRT/MDI 10 by the operator (Step S13). If the machining start command is not inputted, the processings of Steps S11 to S13 are then repeatedly executed until the machining start command is inputted, and the estimated machining termination time is updated and displayed synchronously with the current time Tn.

Subsequently, when the operator inputs the machining start command, the CPU 1 detects this input in a discrimination processing of Step S13, initializes the value k of the machining frequency stored in an actual machining frequency storage register R(k) to "1", and starts an elapsed time determining timer T (Step S14), whereupon the elapsed time from the entry of the machining start command is measured.

Thereafter, the machining program in the nonvolatile memory 2 is read for each block, and the same electrical discharge machining processing (Step S15) as the conventional one for servo feed of each axis and the like is repeatedly executed. Since the contents of the electrical discharge machining processing themselves are the same as the conventional ones, a description of those contents is omitted. The processing differs from the conventional one in that the value k entered in the actual machining frequency storage register R(k) is incremented by 1 every time a series of machining programs (one machining cycle) is finished, and in that the elapsed time determining timer T is reset and restarted every time a series of machining programs (one machining stage) is finished (Steps S16 and S17).

Figure 4:
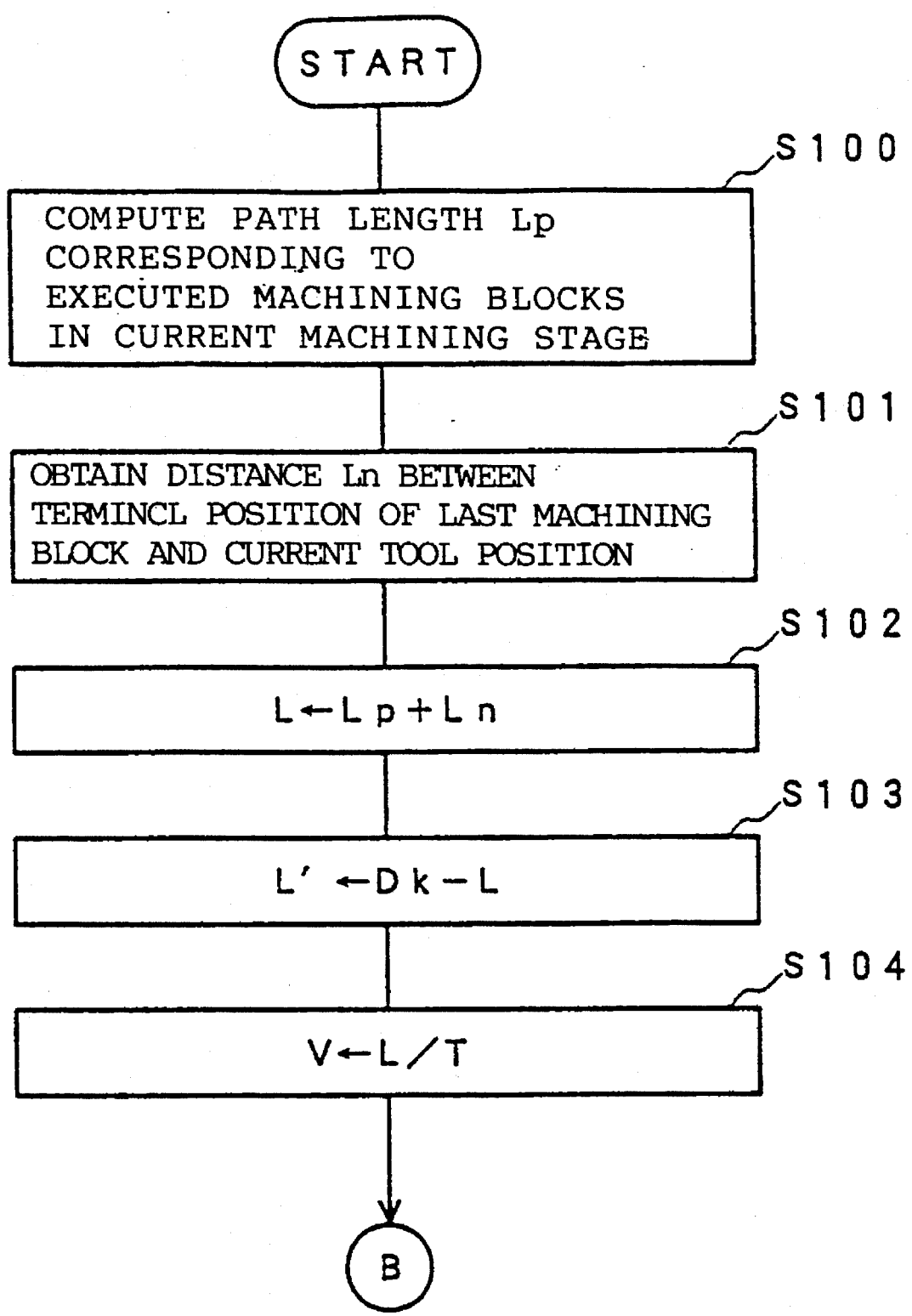
FIG. 4 is a flow chart showing an outline of a modification/display processing in the machining execution mode.
Figure 5:
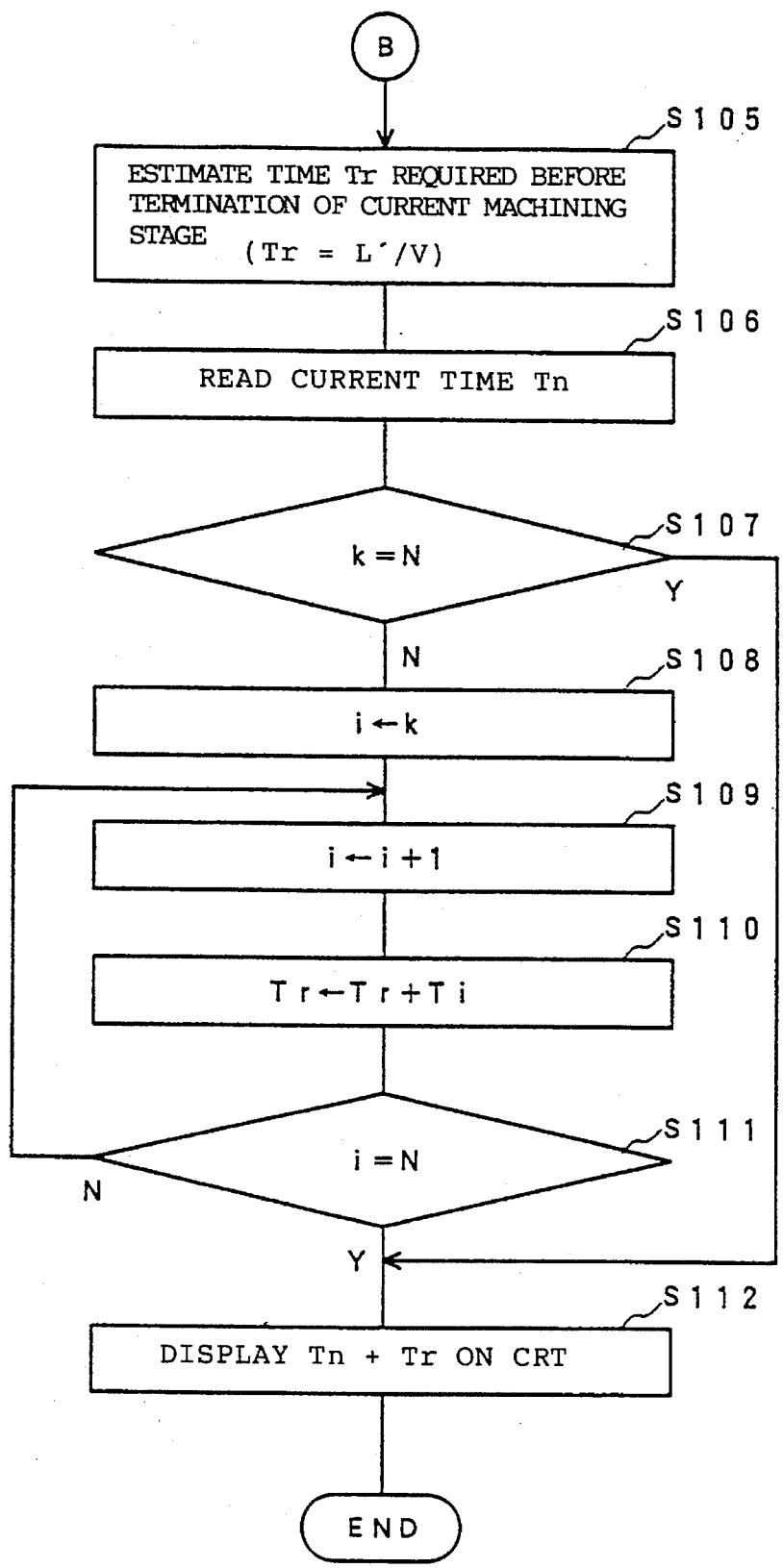
FIG. 5 is a continuation of the flow chart showing the outline of the modification/display processing.

According to the present embodiment, after the start of the electrical discharge machining processing, a modification/display processing for the expected machining termination time, such as the one shown in FIGS. 4 and 5, is further repeatedly executed in predetermined processing cycles, e.g., at intervals of 10 minutes. The following is a description of this processing.

After starting the modification/display processing in a k-th machining stage (Steps S15 to S17), the CPU 1 first detects the position of a program pointer which indicates the machining block given as an object of execution at the current point of time, and computes an overall path length Lp for the machining covering the machining stages from the top of the program to the machining block directly preceding the machining block indicated by the program pointer. This path length Lp is computed in the same manner as in the aforesaid processing of Step S7. More specifically, this computation is based on the offset value and wire electrode diameter selected from the machining condition table corresponding to various set conditions including that the machining stage is the k-th one. The computed value Lp is stored in a machining execution path length storage register R(Lp) (Step S100).

Further, the CPU 1 obtains a path length Ln between a current tool position (coordinate values), indicated by current position storage registers for the individual axes, and the position (coordinates) of the end point of the machining block directly preceding the machining block corresponding to the current position (machining block as the current object of execution). In other words, the length (Ln) of the portion for which the machining has been completed is obtained out of the machining path which corresponds to the machining block as the current execution object. This path length Ln is stored in a covered path length storage register R(Ln) for the current machining block (Step S101).

Subsequently, the value in the register R(Lp) and the value in the register R(Ln) are added to obtain the sum total L of tool movements after the start of the k-th machining stage, and the sum total L is stored in a machining completion path length storage register R(L) (Step S102). Moreover, the CPU 1 subtracts the value of the total sum L of tool movements stored in the machining completion path length storage register R(L) from the value in a stage machining path length storage register R(Dk) stored with the machining path length for the k-th machining stage, thereby obtaining a remainder L' of the machining path length to be traced in the k-th machining stage. Then, this value L' is stored in a stage untraced machining path length storage register R(L') (Step S103).

Figure 6:
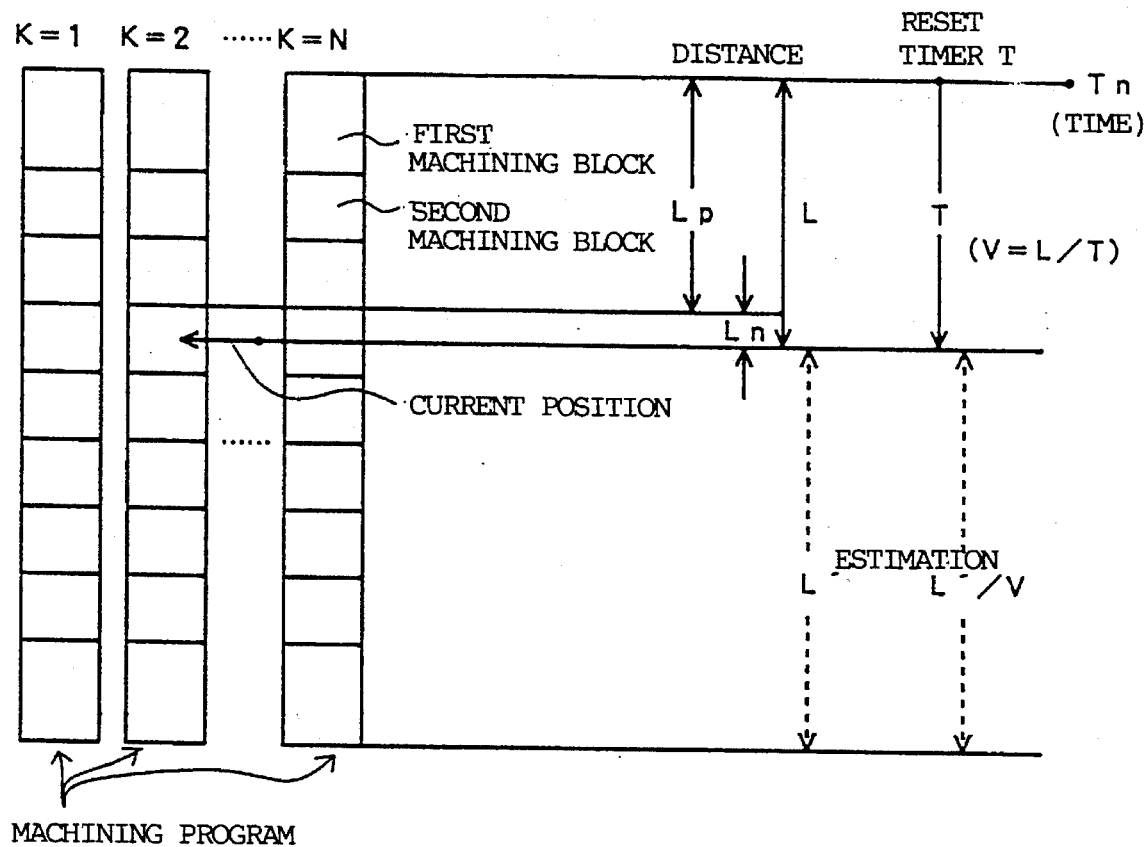
FIG. 6 is a diagram for illustrating the path length for each machining stage.

FIG. 6 shows, for the k-th machining stage, the relationship among the overall path length Lp covering the machining blocks corresponding to the extent ranging from the top of the aforesaid machining program to the machining block immediately preceding the machining block of which execution is currently in progress, the path length Ln corresponding to the already executed portion out of the machining block of which execution is currently in progress, the total tool movement L corresponding to the extent to which the machining has progressed in the present machining stage, and the total tool movement L' corresponding to unexecuted portion.

Furthermore, the CPU 1 reads the measured value of the elapsed time measured by the timer T or the total elapsed time T after the start of machining in the k-th machining stage, divides the value of the current sum total L of tool movements by the elapsed time T, thereby computing an average machining speed V between the start of this machining stage and the current point of time. This average machining speed V is stored in an actual machining speed storage register R(V) (Step S104).

In computing the average machining speed V between the start of the present machining stage and the current point of time in accordance with the sum total L of tool movements and the elapsed time T, the starting point of the tool movement for measuring the sum total L of tool movements is always the position corresponding to the top of the program for the present machining stage, because the same machining program is used for all the machining stages. More specifically, the machining is carried out from the top of the same machining program with every machining stage, so that there is no possibility that the sum total L of tool movements should include the tool movement for the past execution of machining in the preceding or earlier machining stage. Since the timer for determining the elapsed time T for the tool movement is always reset every time one machining stage terminates (see Step S17), this timer never fails to determine the time corresponding to the tool movement L. Thus, the average machining speed V between the start of the present machining stage and the current point of time can be obtained with almost desired accuracy.

After computing the average machining speed V between the start of the k-th machining stage and the current point of time in this manner, the CPU 1 estimates the elapsed time between the current point of time in the middle of the machining stage concerned and the time of termination of the machining stage, applying the average machining speed V also to a machining path (unexecuted) corresponding to the time interval between the current time and the time of termination. More specifically, the CPU 1 divides the length L', the length of the path to be covered in the present machining stage, by the average machining speed V, thereby estimating a time Tr required for executing of the machining from the current point of time to the last. This estimated time is stored in an estimated required time storage register R(Tr).

Subsequently, the CPU i reads the current time Tn from the clock device 3 (Step S106). Further, it is determined whether or not the machining stage concerned is the final machining stage (final or N-th machining stage in the case where the machining frequency is previously set to N) (Step S107). If the machining stage concerned is the final machining stage, the value in the required time storage register R(Tr) is added to the current time Tn, and displays the resulting value directly, as the expected machining termination time, on the CRT screen of the CRT/MDI 10 (Step S112), whereupon the modification/display processing for this processing period terminates.

If the currently executed machining stage (k-th) is not the final machining stage (k !b N), the time when all of the machining stages will terminate is the time when the sum of the time period Tr required for machining the unexecuted portion in the present machining stage and the estimated machining time Ti required for machining from next machining stage (k+1-th stage) to the last machining stage (see Step S8: i=k+1; k=2,!&!&!& N) have passed from the present time. Thereupon, the value stored in the machining frequency storage register R(k) (see Step S17) is given to the index i (Step S108), and the value of the index i is increased 1 by 1 (Step S109) until it reaches the set machining frequency N (Step S111); the value in the estimated required time storage register R(Ti) for the i-th machining stage specified by the index i is read; the read value is integrated and stored in the required time storage register R(Tr) (Step S110); and the sum total Tr of the remainder of the required time necessary for the currently executed k-th machining stage and estimated values of stage required machining times necessary for the individual machining stages corresponding to the machining stage (k+1) to N is obtained.

When it is concluded in a discrimination processing of Step S111 that the set machining stage N is reached by the index i, the value stored in the required time storage register R(Tr) corresponds to the time required for the termination of all the machining stages from the current point of time on. In other words, the expected machining termination time is the time when the time stored in the required time storage register R(Tr) will have passed after the current point of time. Thereupon, the value stored in the required time storage register R(Tr) is added to the current time Tn read from the clock device 3, and the resulting value is displayed as the expected machining termination time on the CRT screen of the CRT/MDI 10 (Step S112), whereupon the modification/display processing for this processing period terminates.

Thereafter, the CPU 1 repeatedly executes the modification/display processing shown in FIGS. 4 and 5 in predetermined processing cycles, e.g., at intervals of 10 minutes, thereby updating and displaying the expected machining termination time.

In predicting the machining termination time for machining operation for multiple machining, according to the one embodiment, as described above, the time Tr between current point of time and the end of the present machining stage is first estimated based on the actual machining speed used during the period between the start of the present machining stage and the current point of time, and the total required elapsed time between the start of the next machining stage and the end of the the final machining stage is then calculated by using a stage estimated predetermined time previously obtained for each machining stage, whereby the elapsed time between the current point of time and the termination of all the machining stages is estimated. This estimation of the elapsed time between the current point of time and the termination of all the machining stages is executed in every fixed time.

Alternatively, the actual machining speed V may be computed with every termination of machining for a predetermined number of machining blocks so that the estimated machining termination time can be updated and displayed. Naturally, in this case, the processings (Step S101 and subsequent Step S102) for obtaining the length (Ln) of the executed portion of the machining path corresponding to the machining block as the object of execution at the current point of time are omitted.

Moreover, for the individual machining stage where machining has already been finished, the ratio of the elapsed time required actually for machining to the estimated time required estimated in Step S8 is obtained. Therefore, by using that ratio, the estimated time required Ti (i=k+1 to N) for machining stages that have to be executed hereafter (that is, time required for processing the machining stage subsequent to a current stage under execution to the final machining stage) can be modified for an improvement.

Also, the time required for the termination of the final machining may be displayed together with the estimated machining termination time, or only the time required for the termination of the final machining may be displayed.

Furthermore, the expected machining termination time may be obtained based on the machining speed obtained with every predetermined period after the start of the machining operation without predicting the termination time before the start of the machining operation. In this case, if machining stages such as second, third and the following stages are continuously executed at different machining speeds, as in the electrical discharge machining, coefficients for obtaining the machining speeds for the stages such as second, third and the following stages based on the machining speed of the first stage are set in the memory beforehand.

Although the wire electrical discharge machine has been described as an example in connection with the embodiment, the present invention may be also applied to some other machine tools.

I claim:

1. A numerical control device for controlling a machine tool for repeatedly executing a number of machining stages from rough machining to finish machining by using one machining program, capable of predicting a machining termination time, comprising:

stage average speed estimating means for estimating an average machining speed from the start to end of each machining state in accordance with machining conditions previously set for each machining stage;

stage path length computing means for computing a machining path length for each machining stage in accordance with said machining program and said machining conditions;

stage required time estimating means for estimating a required machining time for each machining state in accordance with the values computed by said average speed estimating means and path length computing means;

executed machining path length calculating means for calculating the length of a machining path from a starting position of the currently executed machining stage to the current position;

elapsed machining time clocking means for calculating elapsed machining time, said elapsed machining time clocking means adapted to be reset synchronously with the start of each machining stage and start clocking on elapsed machining time;

actual average machining speed computing means for computing an actual average machining speed for the machining path from the machining starting position of the currently executed machining state to the current position based on the elapsed machining time given by said elapsed machine time clocking means and the executed machining path length computed by said executed machining path length calculating means;

remaining machining path estimating means for estimating a required machining time for machining an unexecuted portion of the currently executed machining stage based on a value obtained by subtracting the executed machining path length, calculated by said executed machining path length calculating means, from the machining path length for the currently executed machining stage, computed by said stage path length computing means, and the average machining speed computed by said actual average machining speed computing means;

total remaining machining stage estimating means for adding up required times estimated for the individual machining stages from the machining stage next to the currently executed machining stage to the final machining stage by means of said stage required time estimating means;

expected machining termination time computing means for obtaining, after the current time, the point of the lapse of a time period equal to the sum of the remaining machining path estimated by means of said remaining machining path estimating means and the required machining time estimated by means of said total remaining machining stage estimating means; and expected machining termination time display displaying the expected machining termination time obtained by means of said expected machining termination time computing means.

2. A numerical control device for predicting a machining termination time according to claim 1, wherein said stage average speed estimating means estimates the average machining speed from the start to end of each machining stage based on a maximum machining speed and a minimum machining speed for each machining stage predetermined by said machining program.

3. A numerical control device for predicting a machining termination time according to claim 1, wherein said stage average speed estimating means estimates the average machining speed for a first machining state in accordance with the machining conditions predetermined for said machining stage, and obtains the average machining speeds for a second and subsequent machining stages by multiplying the estimated average machining speed for the first machining stage by predetermined coefficients.

4. A numerical control device for predicting a machining termination time according to claim 1, wherein the computation or estimation by means of said machining path length computing means, actual average machining speed computing means, remaining machining time for machining path estimating means, total remaining machining stage estimating means, and expected machining termination time computing means is executed with every predetermined time, and the machining termination time is updated and displayed each corresponding time by said machining termination time display.

5. A numerical control device for predicting a machining termination time according to claim 1, wherein the computation or estimation by means of said machining path length computing mans, actual average machining speed computing means, remaining machining path estimating means, total remaining machining stage estimating means, and expected machining termination time computing means is executed with every termination of a predetermined number of machining blocks of said machining program, and each machining termination time is updated and displayed by said machining termination time display.

6. A numerical control device for predicting a machining termination time according to claim 1, which further comprises average machining speed modifying means for fetching the actual average machining speed for a finished machining stage from said actual average machining speed computing means, for comparing said value with the estimated average machining speed for the corresponding machining stage estimated by means of said stage average speed estimating means, and for modifying the output of said remaining machining stage estimating means based on the result of the comparison.

7. A numerical control device for predicting a machining termination time according to claim 1, wherein said machine tool is a wire electrical discharge machine.

\* \* \* \* \*